United States Patent [19]
Heiliger

[11] Patent Number: 6,139,479
[45] Date of Patent: *Oct. 31, 2000

[54] APPARATUS AND METHOD FOR MANUFACTURE OF CONTAINERS OF VARIABLE LENGTH

[75] Inventor: Richard Heiliger, Cash County, Utah

[73] Assignee: Reynolds Consumer Products, Inc., Appleton, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 09/027,604

[22] Filed: Feb. 23, 1998

[51] Int. Cl.$^7$ ........................................................ B31B 1/64
[52] U.S. Cl. ................................ 493/22; 493/8; 493/363; 493/195; 493/197; 493/200; 493/202; 493/205; 493/208
[58] Field of Search ..................................... 493/195, 196, 493/197, 198, 200, 201, 202, 205, 208, 8, 22, 35, 362, 3

[56] References Cited

U.S. PATENT DOCUMENTS

| | | |
|---|---|---|
| 619,634 | 2/1899 | Thomson . |
| 2,627,893 | 2/1953 | Williams . |
| 2,693,221 | 11/1954 | Lyijynen . |
| 2,770,936 | 11/1956 | Clark . |
| 3,083,757 | 4/1963 | Kraft et al. . |
| 3,108,034 | 10/1963 | Hannon . |
| 3,394,245 | 7/1968 | Waldrop . |
| 3,616,095 | 10/1971 | Membrino ................................ 156/582 |
| 3,797,368 | 3/1974 | Martelli ...................................... 93/8 R |
| 4,048,003 | 9/1977 | Bolli ......................................... 156/515 |
| 4,198,259 | 4/1980 | van der Meulen ...................... 156/498 |
| 4,306,400 | 12/1981 | Coleman et al. .......................... 53/373 |
| 4,333,790 | 6/1982 | Schaffron ................................. 156/510 |
| 4,444,613 | 4/1984 | Burmeister .............................. 156/446 |
| 4,617,850 | 10/1986 | Bishop ........................................ 83/324 |
| 4,642,084 | 2/1987 | Gietman, Jr. ............................ 493/190 |
| 4,934,993 | 6/1990 | Gietman, Jr. .............................. 493/11 |
| 5,122,219 | 6/1992 | Ludwig ................................ 156/379.6 |
| 5,338,281 | 8/1994 | Terranova .................................. 493/28 |
| 5,417,638 | 5/1995 | Anderson et al. .......................... 493/11 |
| 5,833,107 | 11/1998 | Terranova et al. ...................... 493/196 |
| 6,004,252 | 12/1999 | Blaser .......................................... 493/3 |

Primary Examiner—Peter Vo
Assistant Examiner—Louis K. Huynh
Attorney, Agent, or Firm—Alan M. Biddison

[57] ABSTRACT

An apparatus for manufacturing containers or bags includes a sealer that produces seals on a moving film. These seals are spaced at intervals that determine the length of the containers. An operator can change the desired container length while the film is moving. In response to such changes, a control arrangement adjusts the speed at which the sealer rotates and, in turn, the spacing of the seals and the length of the containers.

19 Claims, 3 Drawing Sheets

APPARATUS AND METHOD FOR MANUFACTURE OF CONTAINERS OF VARIABLE LENGTH

FIELD OF THE INVENTION

The present invention relates to the manufacture of containers, such as disposable plastic bags. More particularly, the present invention relates to arrangements and methods for manufacturing containers of variable length.

BACKGROUND OF THE INVENTION

Many consumer packaging applications employ containers, such as disposable bags and reclosable plastic bags.

Mass producing plastic bags often involves sealing and cutting or perforating a moving film of polymeric (plastic) material. Other processes or operations may be involved in the production of certain types of plastic bags. Some conventional techniques for producing plastic bags involve performing these processes using a series of forming elements that engage the moving film for a limited amount of time. Because the period of engagement between a given forming element and the film is limited, the process, e.g., sealing, performed by the forming element must be accomplished fairly rapidly. These time constraints potentially compromise the quality of certain processes. For example, a sealing element might form an undesirable or unacceptably high number of incomplete seals.

In order to address these problems, techniques have been proposed to increase the time period during which a forming element is in contact with the portion of the film on which the corresponding process is performed. Some machines, for example, use rollers to adjust this amount of time. This adjustment has typically been performed with the machine stopped. Furthermore, adjusting, for example, the distance between seals on the film has typically involved installing a seal drum of a different diameter. This installation is difficult to perform while the film is running, limiting the ability to change bag and zipper skirt lengths on the fly.

SUMMARY OF THE INVENTION

The present invention is directed to apparatuses and methods for manufacturing bags, such as disposable bags and reclosable bags. In one particular embodiment, an apparatus for manufacturing bags or containers includes a sealer, configured and arranged to receive a film and to rotate with a surface speed in response to a control signal. The sealer has a seal generator for producing seals on the film at user-adjustable intervals. These seals define closed ends of the containers. A pre-separator is configured and arranged to perforate the film at the user-specified intervals to facilitate separation of the containers. Control means is configured and arranged to generate the control signal for varying the surface speed of the sealer in response to a change in the user-adjustable intervals.

Another embodiment of the present invention is directed to a sealing arrangement for use in an apparatus for manufacturing bags or containers. The sealing arrangement includes a drum configured and arranged to rotate at a speed that is adjusted in response to changes in a user-specified seal interval parameter. A seal generator is disposed on the drum and is configured and arranged to selectively contact and produce seals on a film as the drum rotates to define closed ends of the containers. A plurality of rollers are disposed around a circumference of the drum and are configured and arranged to alter a surface speed of the sealing arrangement relative to the speed at which the drum rotates.

According to a method embodiment of the present invention, containers are produced by engaging a film on a sealing arrangement. The sealing arrangement is rotated at a rotational speed to produce seals on the film. User input indicating a desired container length is received. The rotational speed is adjusted in response to the user input so as to adjust spacing between the seals to the desired container length.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

Other aspects and advantages of the present invention will become apparent upon reading the following detailed description and upon reference to the drawings, in which.

Figure 1:
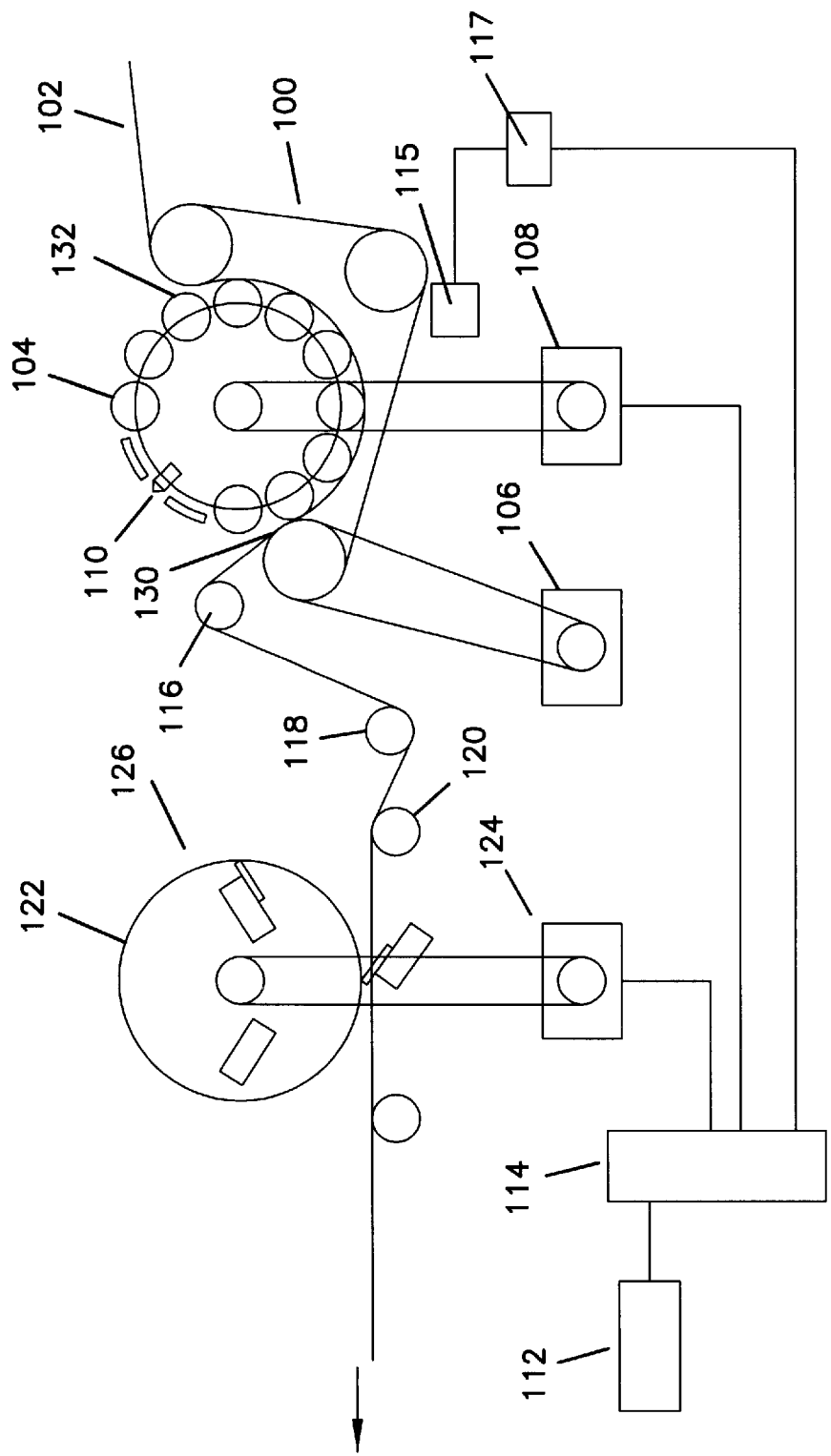
FIG. 1 illustrates an example apparatus for manufacturing bags, according to a particular embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of this invention as defined by the appended claims.

DETAILED DESCRIPTION

The present invention is believed to be applicable to a variety of systems and methods for manufacturing bags, such as disposable bags and possibly reclosable bags. The invention has been found to be particularly advantageous in environments in which it is desirable to produce bags of varying lengths. An appreciation of various aspects of the invention is best gained through a discussion of various application examples operating in such environments.

Referring now to the drawings, FIG. 1 illustrates an example apparatus for manufacturing bags, according to an embodiment of the present invention. A seal belt 100 advances a film 102 so that the film 102 is engaged by a sealing drum 104, which is driven by a servo motor 108. According to a particular embodiment, the seal belt 100 is driven by a conventional variable speed AC or DC motor drive 106. A sealing bar 110 mounted on the sealing drum 104 seals the film 102 at intervals that the operator can specify by providing control signals, such as digital input, using an operator interface 112. The operator interface 112 can be implemented, for example, using a numeric keypad. A servo indexer 114 implemented using, for example, an appropriately-programmed computer arrangement, uses the operator-supplied digital input to calculate acceleration/deceleration ratios that will result in the specified seal intervals.

A footage wheel 115 monitors the speed of the seal belt 100 and provides this information to an encoder 117. The encoder 117 encodes the speed information and presents the encoded data to the servo indexer 114. In this manner, the servo indexer 114 tracks the speed of the seal belt 100. The servo indexer 114 then provides a digital control signal to the servo motor 108 to accelerate or decelerate the sealing drum 104 as appropriate, causing the sealing drum 104 to produce seals on the film 102 at the specified intervals. Accordingly, the bag length can be adjusted without stopping the incoming film 102 or changing to a sealing drum having a different diameter.

In the embodiment depicted in FIG. 1, rollers 116, 118, and 120 guide the film 102 to a perforation drum 122, which is driven by a servo motor 124. The servo motor 124 also receives the control signal from the servo indexer 114 and causes a perforation bar 126 to produce perforated lines along the film 102 at the same intervals at which the film 102 is sealed. The perforated lines weaken the structure of the film and facilitate separation of the bags. In addition to specifying the distance between seals, the operator can use the interface 112 to specify the distance between seals and corresponding perforations while the film 102 is running through the apparatus. Furthermore, the sealing drum 104 and the perforation drum 122 can be stopped independently of each other and of the seal belt 100 to, for example, adjust the depth of the perforation bar 126. By using the servo indexer 114 to control the acceleration and deceleration of the sealing drum 104 and the perforation drum 122, the user can adjust the apparatus to produce bags of different lengths and perforation-to-seal registrations even while the film 102 is running faster than 500 feet per minute. Furthermore, a single sealing drum 104 can be used to produce seals at a range of seal intervals, e.g., 24 inches to 48 inches or more for large disposable bags.

The operation of the apparatus illustrated in FIG. 1 can be understood with reference to a particular example. In this particular example, the apparatus is configured and arranged to produce seals at 38-inch intervals. The sealing drum 104 is initially oriented such that the sealing bar 110 is pointing upward and away from the seal belt 100, as illustrated in FIG. 1. When the sealing drum 104 is oriented in this manner, the sealing bar 110 is in a position roughly halfway between points 130 and 132 at which the sealing drum 104 respectively leaves and re-engages contact with the seal belt 100. Next, the sealing drum 104 begins rotating and is accelerated until its surface speed matches the speed of the seal belt 100 and film 102. The sealing drum 104 and the seal belt 100 travel at the same speed until a trailing slat 128 on the sealing drum 104 leaves contact with the film 102. At that time, the sealing drum 104 decelerates until the sealing bar 110 returns to its original position. To make bags of a different length, the servo indexer 114 adjusts the periods of acceleration and deceleration, as well as the velocity of the sealing drum 104 when not in contact with the seal belt 100.

Figure 2:
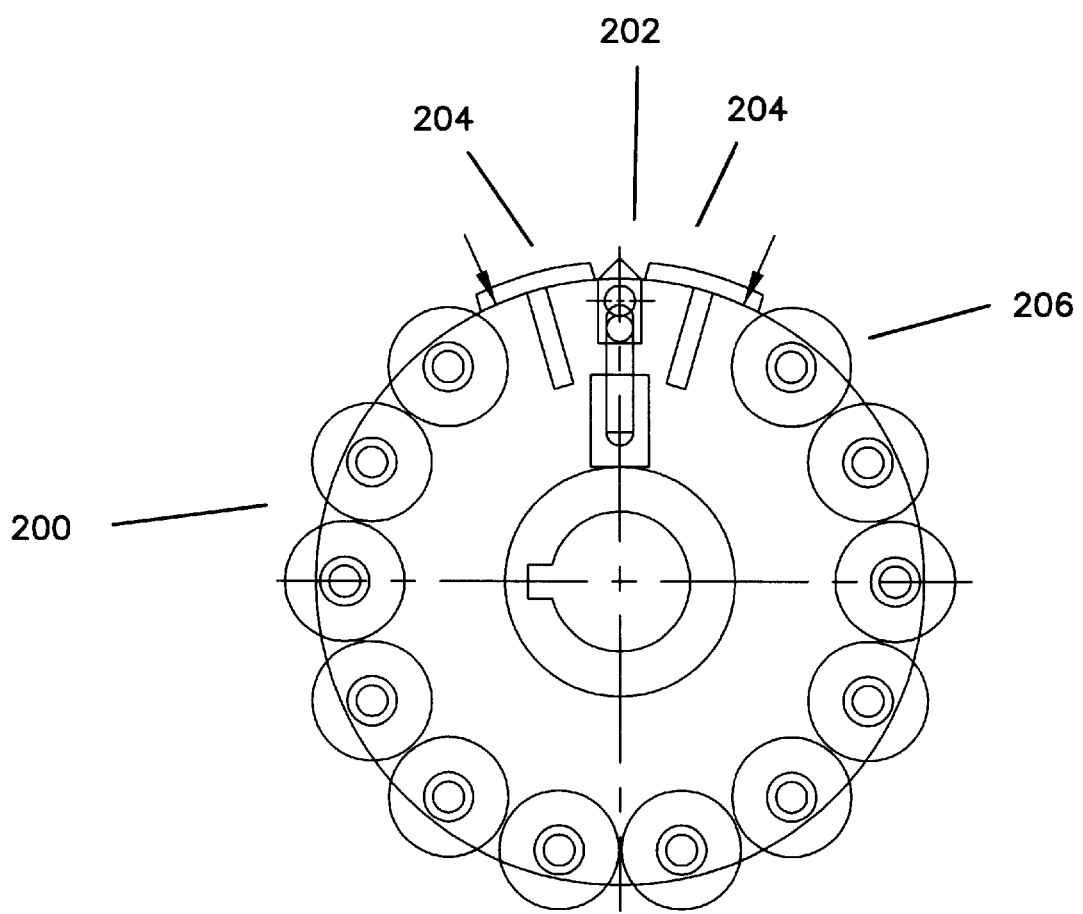
FIG. 2 illustrates a sectional profile view of an example sealing drum, according to another particular embodiment of the present invention.
Figure 3:
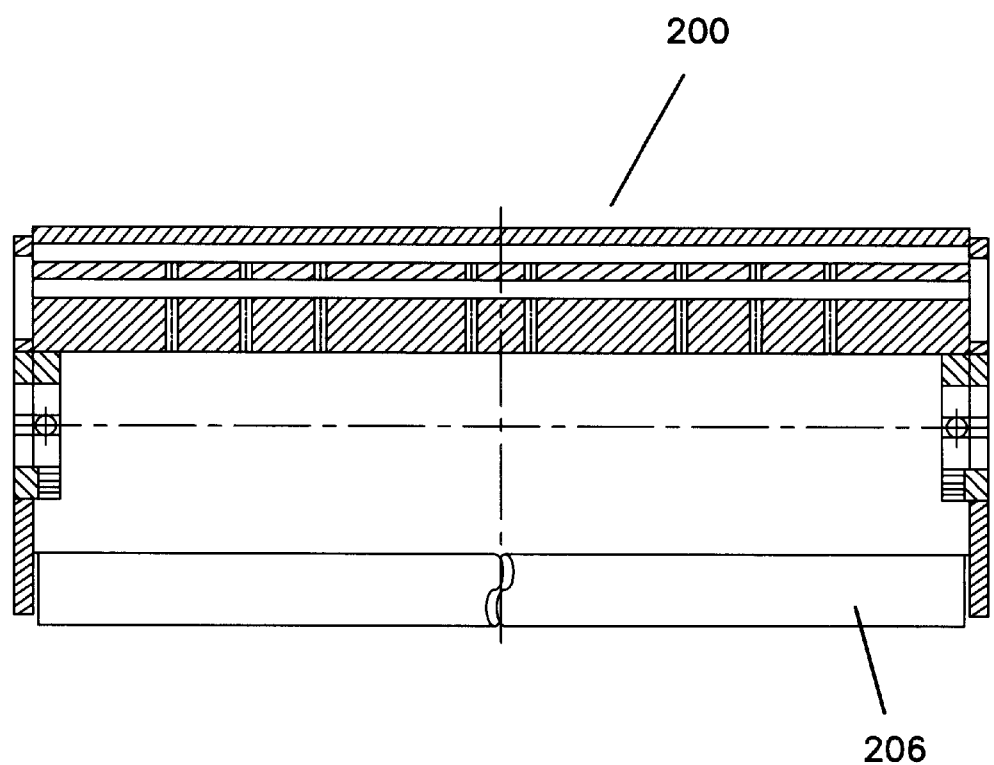
FIG. 3 illustrates a sectional elevational view of the sealing drum depicted in FIG. 2.

FIGS. 2 and 3 respectively illustrate sectional profile and elevational views of a sealing drum 200, according to an embodiment of the present invention. A sealing bar 202 is fixedly mounted on the sealing drum 200 to produce seals on the film at operator-specified intervals using, for example, heat-sealing techniques. Slats 204 are fixedly mounted on either side of the sealing bar 202. According to a particular embodiment of the present invention, the slats are about three inches wide. A plurality of rollers 206 are mounted inside the sealing drum 200 to allow the sealing drum 200 to run at a surface speed faster or slower than the speed of the film and seal belt, while allowing the film and seal belt to run at a constant speed. According to a particular embodiment of the present invention, twelve rollers 206 that are 40 inches long and 2 inches in diameter are mounted around the sealing drum 200, such that the sealing drum 200 has a circumference of about 36 inches as measured around the rollers 206, the slats 204, and the sealing bar 202.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. An apparatus for manufacturing containers, the apparatus comprising:
   (a) a first motor;
   (b) a seal belt, driven by said first motor, that advances a film through the apparatus at a first speed;
   (c) a second motor;
   (d) a sealer, driven by said second motor, that receives the film and produces seals on aid film at a first interval;
   (e) a third motor;
   (f) a pre-separator, driven by said third motor, that produces separation lines along the film at a second interval to facilitate separation of the containers; and
   (g) a controller that, during operation as appropriate, controls:
      (i) the first motor to vary the first speed, independent of the first interval and second interval;
      (ii) the second motor to vary the first interval, independent of the first speed and second interval; and
      (iii) the third motor to vary the second interval, independent of the first speed and first interval.

2. An apparatus according to claim 1 wherein:
   (a) the controller generates a first control signal to the second motor to vary the first interval.

3. An apparatus according to claim 2 wherein:
   (a) the controller generates a second control signal to the third motor to vary the second interval.

4. An apparatus according to claim 3 wherein:
   (a) the controller generates a third signal to the first motor to vary the first speed of the seal belt.

5. An apparatus according to claim 4 further comprising:
   (a) a footage wheel that detects the first speed of the seal belt and provides an indication of the first speed to the controller.

6. An apparatus according to claim 5 wherein:
   (a) the controller generates the first and second control signals in response to the first speed.

7. An apparatus according to claim 1 further comprising:
   (a) an operator interface that transmits digital input indicating the first speed, first interval, and second interval to the controller, wherein the operator interface allows a user to vary, independently as appropriate, the first speed, first interval, and second interval.

8. An apparatus according to claim 1 wherein:
   (a) the controller calculates at least one of an acceleration period of the sealer and a deceleration period of the sealer as a function of the first speed, first interval, and second interval.

9. An apparatus according to claim 8 wherein:

(a) the controller varies the first interval in response to the acceleration period and varies the second interval in response to the deceleration period.

10. An apparatus according to claim 1 wherein:

(a) the sealer includes:

(i) a drum;

(ii) a seal generator disposed on a circumference of the drum, the seal generator producing seals on the film at a first interval to define closed ends of the containers; and (iii) a plurality of rollers disposed around the circumference of the drum, the plurality of rollers allowing a surface speed of the drum to produce the seals on the film at the first interval independently from the first speed of the seal belt.

11. A method for manufacturing containers, the method comprising:

(a) advancing a film through an apparatus at a first speed;

(b) producing seals on the film at a first interval to define closed ends of the containers;

(c) producing separation lines along the film at a second interval to facilitate separation of the containers; and (d) adjusting, as appropriate during operation, the first speed through a first motor, independent of the first interval and second interval; the first interval through a second motor, independent of the first speed and second interval; and the second interval through a third motor, independent of the first speed and first interval.

12. A method of manufacturing according to claim 11 further comprising:

(a) before said step of adjusting, generating a first control signal to the second motor.

13. A method of manufacturing according to claim 12 further comprising:

(a) before said step of adjusting, generating a second control signal to the third motor.

14. A method of manufacturing according to claim 13 further comprising:

(a) before said step of adjusting, generating a third control signal to the first motor.

15. A method of manufacturing according to claim 14 further comprising:

(a) before said steps of generating first, second, and third control signals, detecting the first speed.

16. A method of manufacturing according to claim 15 wherein:

(a) the step of generating a first control signal includes generating a first control signal to the second motor in response to the first speed;

(b) the step of generating a second control signal includes generating a second control signal to the third motor in response to the first speed; and (c) the step of generating a third control signal includes generating a third control signal to the first motor in response to the first speed.

17. A method of manufacturing according to claim 11 further comprising:

(a) inputting the first speed, first interval, and second interval.

18. A method of manufacturing according to claim 17 wherein:

(a) the step of inputting includes inputting by a user the first speed, first interval, and second interval.

19. A method of manufacturing according to claim 11 further comprising:

(a) calculating at least one of an acceleration period of a sealer and a deceleration period of a sealer as a function of the first speed, first interval, and second interval, wherein:

(i) the step of adjusting includes adjusting the first interval in response to the acceleration period and adjusting the second interval in response to the deceleration period.

\* \* \* \* \*